United States Patent [19]

Pietschmann et al.

[11] 4,078,136

[45] Mar. 7, 1978

[54] PROCESS FOR THE PRODUCTION OF A COPOLYMER FROM A GASEOUS MONOMER AND A LIQUID MONOMER

[75] Inventors: Peter Pietschmann; Peter Ludwig, both of Burghausen, Germany

[73] Assignee: Wacker-Chemie GmbH, Munich, Germany

[21] Appl. No.: 719,352

[22] Filed: Sep. 1, 1976

[30] Foreign Application Priority Data

Sep. 30, 1975 Germany .............................. 2543657

[51] Int. Cl.² .......................................... C08F 210/02
[52] U.S. Cl. .................................. 526/331; 526/345; 526/348
[58] Field of Search ....................... 526/348, 331, 345

[56] References Cited

U.S. PATENT DOCUMENTS

| | | | |
|---|---|---|---|
| 2,497,291 | 2/1950 | Brubaker et al. ...................... | 526/345 |
| 3,250,714 | 5/1966 | Ilnyckyj et al. ....................... | 526/331 |
| 3,501,440 | 3/1970 | Kamio et al. ......................... | 526/345 |

*Primary Examiner*—Harry Wong, Jr.
*Attorney, Agent, or Firm*—Hammond & Littell

[57] ABSTRACT

A process for the production of a copolymer from at least one monomer which is gaseous under the polymerization conditions and at least one monomer that is liquid under the polymerization conditions by copolymerizing the same discontinuously in an aqueous media employing a polymerization vessel under conditions whereby a gas space is required, said gas space being provided by a second vessel connected to the polymerization vessel through a closeable connection, whereby on completion of polymerization, the closeable connection is closed in order to retain the gaseous monomer under pressure.

5 Claims, 1 Drawing Figure

U.S. Patent     March 7, 1978     4,078,136
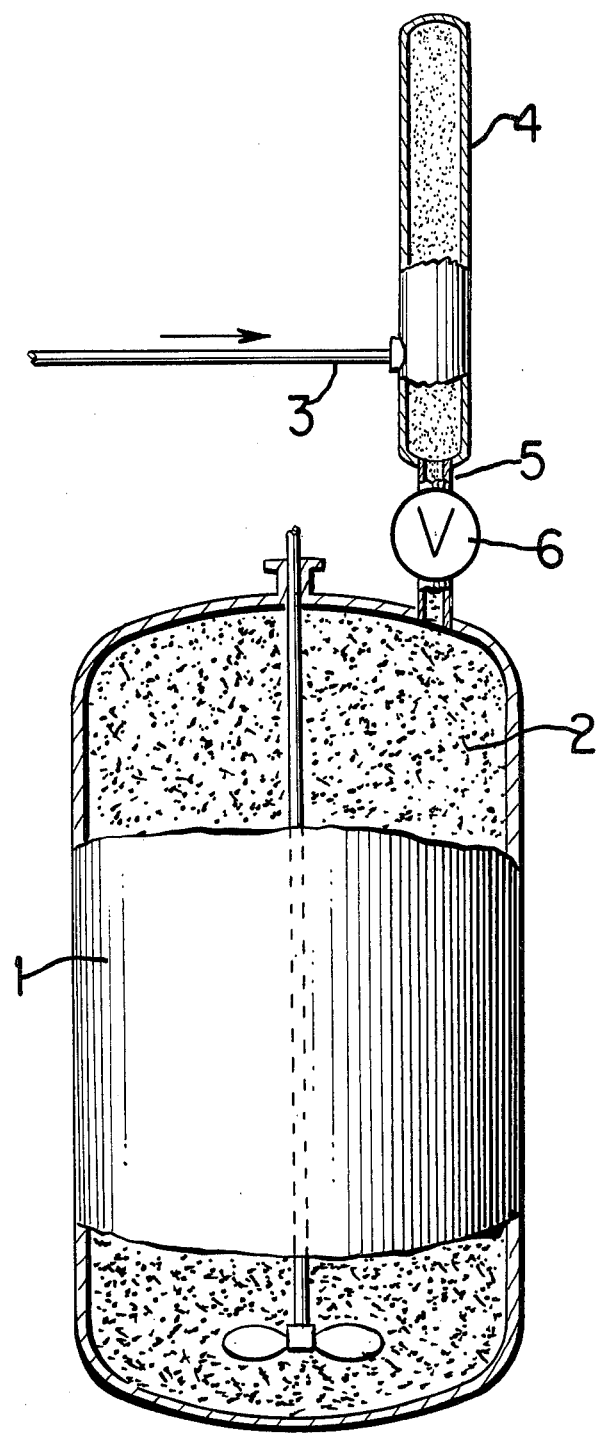

PROCESS FOR THE PRODUCTION OF A COPOLYMER FROM A GASEOUS MONOMER AND A LIQUID MONOMER

RELATED ART

The discontinous process for the manufacture of a copolymerizate from at least one monomer that is gaseous under the polymerization conditions and at least one monomer that is liquid under the polymerization conditions is well known. Processes of this type are customarily carried out in an autoclave or other polymerization vessel and, at the termination of the polymerization, unreacted gaseous monomer is often present in a gas space above the liquid level in the polymerization vessel. This gas space may have been caused by contraction of the volume of the liquid polymerization medium during polymerization or it may have been present throughout the polymerization for safety reasons, for example, in processes in which the volume of the liquid polymerization medium fluctuates during polymerization. In the former case, the formation of the gas space can sometimes be prevented by pressure of liquid, but this is not possible in the second case since the volume can expand as well as contract. When, at the end of the polymerization process pressure in the polymerization vessel is released, the gas contained in the gas space either is lost or has to be recovered by means of a recovery plant.

OBJECTS OF THE INVENTION

An object of the present is to develop a process for the discontinuous production of a copolymerizate from a gaseous monomer and a liquid monomer comprising the steps of mixing at least one monomer which is liquid under the polymerization conditions with a liquid polymerization medium in a first confined space, polymerizing said liquid monomer with at least one monomer which is gaseous under the polymerization conditions under excess pressure in said liquid polymerization medium in the presence of a free-radical polymerization catalyst, supplying a second confined gas space above said liquid polymerization medium, said second confined gas space being in pressure sealable communication with said first confined space, continuing said polymerization until termination while continuously supplying said gaseous monomer under said excess pressure, pressure sealing said second confined gas space, terminating said polymerization by relieving said excess pressure while maintaining said excess pressure in said pressure sealed second confined gas space.

This and other objects of the invention will become more apparent as the description of the invention proceeds.

THE DRAWING

The drawing is a schematic view of one apparatus for the practice of the invention.

DESCRIPTION OF THE INVENTION

The present invention provides a process for the manufacture of a copolymer from at least one monomer that is gaseous under the polymerization conditions and at least one monomer that is liquid under the polymerization conditions, which comprises copolymerizing the monomers in a discontinuous manner and under excess pressure in a liquid polymerization medium in the presence of a free-radical initiator in a polymerization vessel with gaseous monomer present in a gas space above the liquid polymerization medium, wherein at least part of the gas space is contained within a second vessel connected to the polymerization vessel and wherein, at the termination of polymerization, the said second vessel is closed off from the polymerization vessel and, subsequently, the excess pressure in the polymerization vessel is released.

More particularly, the present invention relates to a process for the discontinuous production of a copolymerizate from a gaseous monomer and a liquid monomer comprising the steps of mixing at least one monomer which is liquid under the polymerization conditions with a liquid polymerization medium in a first confined space, polymerizing said liquid monomer with at least one monomer which is gaseous under the polymerization conditions under excess pressure in said liquid polymerization medium in the presence of a free-radical polymerization catalyst, supplying a second confined gas space above said liquid polymerization medium, said second confined gas space being in pressure sealable communication with said first confined space, continuing said polymerization until termination while continuously supplying said gaseous monomer under said excess pressure, pressure sealing said second confined gas space, terminating said polymerization by relieving said excess pressure while maintaining said excess pressure in said pressure sealed second confined gas space.

By means of this process it is possible to maintain at least part of the gaseous monomer under excess pressure for use in a subsequent polymerization process. The proportion of gas maintained under pressure in this way depends, of course, on the relative amounts of gaseous monomer present in the second vessel and in the polymerization vessel. Advantageously, the process is so controlled that, immediately prior to closing off the second vessel from the polymerization vessel, the level of the liquid polymerization medium is immediately below the point at which the closing off is effected. In this way, practically the entire amount of residual gaseous monomer can be retained in the second vessel for subsequent use. The present process has the advantage that the residual gaseous monomer is neither wasted nor has to be subjected to a gas recovery process prior to further use.

The present process is particularly suitable for the copolymerization of two or more olefinically-unsaturated compounds, at least one of which is gaseous under the polymerization conditions. Examples of gaseous olefinically-unsaturated compounds are ethylene and propylene, which may suitably be used in amounts of from 5% to 50% by weight based on the total monomers.

Examples of liquid olefinically unsaturated compounds are vinyl esters, for example, those of formic acid or a fatty acid having up to 12 carbon atoms in the alkyl radical, for example vinyl acetate; olefinically unsaturated carboxylic acids having up to 12 carbon atoms, for example, alkenoic acids having from 3 to 12 carbon atoms such as acrylic acid, methacrylic acid, and alkenedioic acids having from 4 to 12 carbon atoms such as maleic acid, fumaric acid; esters of such acids with aliphatic straight-chained or cyclic alcohols, for example, alkanols having from 1 to 12 carbon atoms and cycloalkanols having from 5 to 8 carbon atoms, such as methyl acrylate, methyl methacrylate, ethyl acrylate, butyl acrylate, ethylhexyl acrylate as well as maleic or fumaric acid semiesters or full esters with said alkanols having up to 12 carbon atoms; amides of such acids, for example, acrylamide, methacrylamide; and N-methylolamides of such acids, for example N-methylolacrylamide; nitriles of such acids, for example acrylonitrile and methacrylonitrile; vinyl halides and vinylidene halides, for example vinyl chloride, vinylidene chloride, vinylidene fluoride; vinyl lower alkyl ketones, for example vinyl ethyl ketone; vinylsulfonic acid; hydroxy-lower alkyl acrylates, such as hydroxyethyl acrylate; as well as bifunctional acrylic esters and vinyl compounds. Mixtures of these monomers may be employed. The preferred liquid monomers are vinyl chloride and vinylacetate.

Polymerization is carried out in aqueous dispersion in the presence of a water-soluble free-radical initiator or polymerization catalyst and a conventional dispersant, in a pressure autoclave, the pressure autoclave is connected with an also pressure-proof equalizing vessel by means of a connection containing a shut-off valve.

Suitable dispersants are, for example, ionic and nonionic emulsifiers and protective colloids as described in greater detail in, for example, Houben-Weyl, "Methoden der organischen Chemie", volume XIV/1, "Makromolekulare Stoffe", Georg Thieme Verlag, Stuttgart, 1961, pages 192–208 and 411–420.

Suitable water-soluble free-radical initiators or polymerization catalysts are especially peroxy compounds, for example, persulfates, for example potassium, sodium and ammonium persulfates, hydrogen peroxide, t-butylhydroperoxide, and perborates. The peroxy-compounds may be used as part of a conventional redox catalyst system, for example, potassium persulfate/hydrogen/palladium sol/iron ammonium sulfate, or ammonium persulfate/sodium formaldehyde sulfoxylate. Alternatively, polymerization can be carried out in an organic medium in the presence of an oil-soluble free-radical initiator or polymerization catalyst and a suitable dispersant, such as described in, for example, German Published Application (DOS) No. 2,140,727, pages 6–8. Molecular-weight regulators, buffers and other conventional polymerization auxiliaries may also be present in the polymerization medium.

Polymerization may be carried out at, for example, a temperature within the range of from 20° C to 85° C. The polymerization pressure will depend on the amount of gaseous monomer to be copolymerized. For example, in the manufacture of a copolymer having a low ethylene content a pressure of about 10 bar may be required, whereas in the manufacture of a copolymer having a high ethylene content a pressure of about 50 bar may be required. Generally, the pressure in the polymerization vessel is maintained constant by feeding in additional gaseous monomer at the rate at which it is consumed. The liquid monomers may also be fed in during the course of the polymerization. The heat of reaction evolved during polymerization may be removed by conventional heat-exchange methods in order to maintain the desired temperature throughout the polymerization.

Polymerization will normally be effected in a pressure autoclave and the second vessel used according to the present process is suitably a pressure vessel connected to the autoclave or other polymerization vessel by means of a pipe provided with a stop-valve. In the process of the invention, at least part of the gas space above the liquid polymerization medium is present in this second vessel. This gas space has various functions: for example, it allows the absorption by or emission from the liquid polymerization medium of the gaseous monomer; it provides for changes in the volume of the liquid polymerization medium caused by the reaction and/or the addition of reactants; and it allows the reaction conditions to be changed safely, which is especially important at high pressure. Some of these changes any occur intentionally and some may occur unintentionally.

A method of carrying out the process according to the present invention will now be described, by way of example only, with reference to the accompanying drawing, which shows a diagrammatic representation of an apparatus suitable for carrying out the present process.

A pressure autoclave 1 contains an aqueous polymerization dispersion 2. A gaseous comonomer, for example ethylene, is fed in via pipe 3 and contained within a second vessel 4, which is connected to the autoclave 1 by means of a pipe 5 provided with a stop valve 6. The valve 6 is kept open throughout the polymerization so that the gas contained in the vessel 4 is in direct communication with the aqueous dispersion 2. The vessel 4 serves as a gas space for the autoclave 1 fulfilling the above-mentioned functions of a gas space. At the termination of the polymerization, the valve 6 is closed prior to releasing the pressure in the autoclave 1 and emptying the autoclave 1. Thus, while the autoclave 1 is being emptied, gaseous monomer can be maintained under pressure in the vessel 4 until it is required for a subsequent polymerization process. Advantageously, the polymerization is so controlled that, at the termination of polymerization, the liquid level in the autoclave 1 is immediately below the valve 6 so that practically all the residual gaseous monomer is contained within the vessel 4.

The present process has a number of advantages over processes in which the whole of the gas space is present in the autoclave: the autoclave space can be used to the maximum by the liquid polymerization medium; and the unreacted gaseous monomers are not lost but can readily be reused; all without forfeiting the previously mentioned advantages of the presence of a gas space during polymerization.

The following examples are illustrative of the practice of the invention without being limitative in any manner.

EXAMPLES

The following two examples illustrate the process of the invention (Example 2) and compare it with a process in which the whole of the gas space is present in the autoclave (Example 1).

EXAMPLE 1

A refined steel pressure autoclave provided with an agitator and cooling jacket and having a working capacity of 6 m³ at a nominal pressure of 64 bar was used in this example for the emulsion copolymerization.

2440 liters of an aqueous solution containing emulsifiers, protective colloids and a small amount of reducing agents, and 490 liters of vinyl acetate were fed into the autoclave, which was then evacuated. While agitating the autoclave contents and establishing an internal temperature of 45° C, ethylene was fed in to a pressure of 40 bar. 15 liters of a 3% by weight aqueous solution of potassium persulfate were then fed in to start the polymerization and, simultaneously, the metering in of vinyl acetate was commenced, and then continued for 6 hours at a constant rate until 1875 Kg of vinyl acetate had been added. Ethylene was added as necessary to replenish that that had been consumed. Additional persulfate solution was also added as necessary. The temperature was maintained at 45° C throughout the polymerization.

When the polymerization had terminated, the ethylene contained in the gas space and in solution was released into the atmosphere and the polymeric dispersion was fed off into another vessel. After subsequent evacuation, 5440 Kg of a stable dispersion were obtained. This contained about 50% by weight of copolymer consisting of 18% by weight of ethylene and 82% by weight of vinyl acetate. 585 Kg of ethylene were used, of which 500 Kg were incorporated in the copolymer and 85 Kg were lost.

When the process was repeated using 2% by weight more of the solution and of the vinyl acetate, there were pressure increases toward the termination of the polymerization which resulted in undesired blowing-off of ethylene with entrained dispersion through the pressure relief valve.

EXAMPLE 2

The apparatus used in this example consisted of the autoclave used in Example 1 connected by means of a pipe containing a stop valve to a refined steel pressure vessel having a working capacity of 0.75 m$^3$ at a nominal pressure of 64 bar.

The procedure of Example 1 was repeated, except that the amounts of the solution and of the vinyl acetate were increased by 9% by weight each. The valve in the connecting pipe was kept open throughout the polymerization. Polymerization proceeded without difficulty.

At the termination of polymerization and before removing the dispersion from the autoclave, the valve 6 was closed to shut off the pressure vessel from the autoclave. 5925 Kg of dispersions similar to that obtained in Example 1 were obtained. 630 Kg of ethylene were used, of which 545 Kg were incorporated in the copolymer, 35 Kg were lost, and 50 Kg remained in the pressure vessel for use in a subsequent polymerization process.

The proceeding specific embodiments are illustrative of the practice of the invention. It is to be understood however that other expedients known to those skilled in the art or disclosed herein, may be employed without departing from the spirit of the invention or the scope of the claims.

We claim:

1. A process for the discontinuous production of a copolymerizate from gaseous ethylene and a liquid ethylenically-unsaturated monomer comprising the steps of mixing at least one ethylenically-unsaturated monomer which is liquid under the polymerization conditions with a liquid polymerization medium in a first confined space, polymerizing said monomer with from 5% to 50% by weight of the total monomers of ethylene which is gaseous under the polymerization conditions at polymerization temperatures of from 20° C to 85° C under constant excess pressure in the range of from 10 bar to 50 bar in said liquid polymerization medium in the presence of a free-radical polymerization catalyst, supplying a second confined gas space above said liquid polymerization medium, said second confined gas space being in pressure sealable communication with said first confined space and of a volume as large as the customary gas space under the polymerization conditions above the liquid level in a conventional first confined space polymerization area, continuing said polymerization until termination while continuously supplying said gaseous ethylene under said constant excess pressure, pressure sealing said second confined gas space, terminating said polymerization by relieving said excess pressure in said first confined space while maintaining said constant excess pressure in said pressure sealed second confined gas space.

2. The process of claim 1 wherein the level of said liquid polymerization medium is so controlled that, immediately prior to said pressure sealing the second confined gas space from the first confined space, said level of the liquid polymerization medium in said first confined space is immediately below the point at which said pressure sealing is effected.

3. The process of claim 1 wherein said liquid monomer is vinyl acetate and/or vinyl chloride.

4. The process of claim 1 wherein said liquid polymerization medium is an aqueous polymerization medium.

5. The process of claim 1 wherein said second confined gas space is 12½% of the volume of said first confined space.

* * * * *